(12) United States Patent
Ming

(10) Patent No.: US 8,576,439 B2
(45) Date of Patent: Nov. 5, 2013

(54) METHOD FOR CALCULATING COLOR TRANSFORM IN WCS PIPELINE

(75) Inventor: Wei Ming, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 978 days.

(21) Appl. No.: 12/651,400

(22) Filed: Dec. 31, 2009

(65) Prior Publication Data

US 2011/0157612 A1 Jun. 30, 2011

(51) Int. Cl.
*G06F 15/00* (2006.01)
(52) U.S. Cl.
USPC .......................................................... 358/1.9
(58) Field of Classification Search
None
See application file for complete search history.

(56) References Cited

U.S. PATENT DOCUMENTS

| 7,697,167 B2* | 4/2010 | Hatori | 358/2.1 |
| 8,237,735 B2* | 8/2012 | Yao et al. | 345/590 |

\* cited by examiner

*Primary Examiner* — Benny Q Tieu
*Assistant Examiner* — Sunil Chacko
(74) *Attorney, Agent, or Firm* — Chen Yoshimura LLP

(57) ABSTRACT

A modified WCS (Windows Color System) pipeline is provided, which calculates the color transform off-line. More specifically, the color transform is calculated once after any profile is changed, and the calculated color transform data is stored for later use. During the printing process (i.e. when the user prints a document), the stored color transform data is retrieved and used by the pipeline to perform subsequent steps such as content color translation, without re-performing the color transform calculation.

15 Claims, 4 Drawing Sheets

US 8,576,439 B2

METHOD FOR CALCULATING COLOR TRANSFORM IN WCS PIPELINE

BACKGROUND OF THE INVENTION

1. Field of the Invention

This invention relates to a printing method using Windows Color System, and in particular, it relates to such a printing method with a more efficient way of calculating color transforms.

2. Description of Related Art

In contrast to a traditional ICC (International Color Consortium) color management scheme, WCS (Windows Color System) used in Windows Vista™ and Windows7 operating systems employs measurement-based profiles and smart CMM (Color Management Modules). In WCS, profiles, which are composed of measurement data and parameters, are made off-line (i.e. not during the printing process), while color transform and color conversion (or content color translation) are performed dynamically during the printing process. The color transform step creates a color transform that applications can use to perform color management. The color conversion step translates an array of colors from the source color space of a source file to the destination color space as defined by the color transform.

The WCS scheme provides measurement-based profiles, with the ability to edit profiles and the improvements in profile interoperability. However, it has potential performance issues, especially when using highly complicated algorithms in color transform and content color translation. For example, when some third party proprietary algorithms are applied, the calculation could take about 10 minutes in some extreme cases.

SUMMARY

The present invention is directed to a method and related apparatus for improving performance in WCS pipeline for color management.

An object of the present invention is to provide a modified WCS pipeline which performs color transform calculation off-line.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a computer equipped with Windows color system (WCS) for printing color images, which includes: (a) providing a plurality of custom plug-in modules; (b) providing one or more profiles, including a customized source color device model (CDM) profile, a customized destination CDM profile, a customized gamut map model (GMM) profile, a source color appearance model (CAM) profile, and a destination CAM profile; (c) upon receiving a first user instruction to change a profile, (c1) changing one or more of the profiles or providing additional profiles; (c2) performing color transform using WCS functions and the custom plug-in modules to calculate color transform data; and (c3) storing the calculated color transform data; (d) upon receiving a second user instruction to print a document, performing content color translation using WCS functions to translate an array of colors from a source color space to a destination color space using the stored color transform data without calculating the color transform data; and (e) repeating step (d) upon receiving third user instruction to print another document.

In another aspect, the present invention provides a method implemented in a computer equipped with Windows color system (WCS) for printing color images, which includes: (a) providing a plurality of custom plug-in modules; (b) providing one or more profiles, including a customized source color device model (CDM) profile, a customized destination CDM profile, a customized gamut map model (GMM) profile, a source color appearance model (CAM) profile, and a destination CAM profile; (c) upon receiving a user instruction to print a document, determining whether a profile has been changed or added since a last document was printed; (d) if a profile has been changed or added since a last document was printed, (d1) performing color transform using WCS functions and the custom plug-in modules to calculate color transform data; (d2) storing the calculated color transform data; and (d3) performing content color translation using WCS functions to translate an array of colors from a source color space to a destination color space using the stored color transform data; (e) if no profile has been changed or added since a last document was printed, performing content color translation using WCS functions to translate an array of colors from a source color space to a destination color space using the stored color transform data without calculating the color transform data; and (f) repeating steps (c), (d) and (e) upon receiving another user instruction to print another document.

In another aspect, the present invention provides a method implemented in a computer equipped with Windows color system (WCS) for printing color images, the computer storing a plurality of custom plug-in modules and one or more profiles, including a customized source color device model (CDM) profile, a customized destination CDM profile, a customized gamut map model (GMM) profile, a source color appearance model (CAM) profile, and a destination CAM profile, the method including: upon receiving a user instruction to print a document, a printer driver program calling a first WCS function which calls the custom plug-in modules; the custom plug-in modules retrieving stored color transform data without calculating the color transform data; and the printer driver program calling a second WCS function to translate the array of colors from the source color space to the destination color space using the retrieved color transform data.

In another aspect, the present invention provides a computer program product comprising a computer usable medium having a computer readable program code embedded therein for controlling a computer, the computer readable program code configured to cause the computer equipped with Windows color system (WCS) to execute a process which comprises: detecting a customized tag in one of the profiles; if the tag has a first pre-determined value, calculating color transform data and storing the calculated color transform data; and if the tag has a second pre-determined value, retrieving stored color transform data without calculating the color transform data.

In another aspect, the present invention provides a computer program product comprising a computer usable medium having a computer readable program code embedded therein for controlling a computer, the computer readable program code being a printer driver configured to cause the computer equipped with Windows color system (WCS) to execute a process for printing color images, the process including: detecting whether a profile has been changed or added since a last document was printed; if a profile has been changed or added since a last document was printed, (a) calling a first WCS function to calculate color transform data; (b) storing the calculated color transform data; and (c) calling a second WCS function to translate an array of colors from a source color space to a destination color space using the stored color transform data; and if no profile has been changed or added since a last document was printed, calling the second WCS function to translate an array of colors from a source color space to a destination color space using the stored color transform data without calculating the color transform data.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a modified WCS pipeline which calculates the color transform off-line, i.e., the color transform is calculated once after any profile is changed and the calculated color transform data is stored for later use. During the printing process (i.e. when the user prints a document), the stored color transform data is retrieved and used by the pipeline to perform subsequent steps such as color conversion (or content color translation), without re-performing the color transform calculation. The invention is implemented in a computer equipped with a Windows operating system and WCS functions, and is implemented by software programs and data stored in a memory and executed by a CPU of the computer.

One embodiment of the present invention provides a utility application program for changing profiles and for calculating and storing the color transform data after a profile change. As used in this disclosure, a profile change may include modifying existing profiles and/or creating new profiles associated with existing profiles and/or selecting a different profile. Alternatively, in another embodiment, a modified printer driver is provided to perform the color transform calculation upon detecting a profile change.

Figure 1:
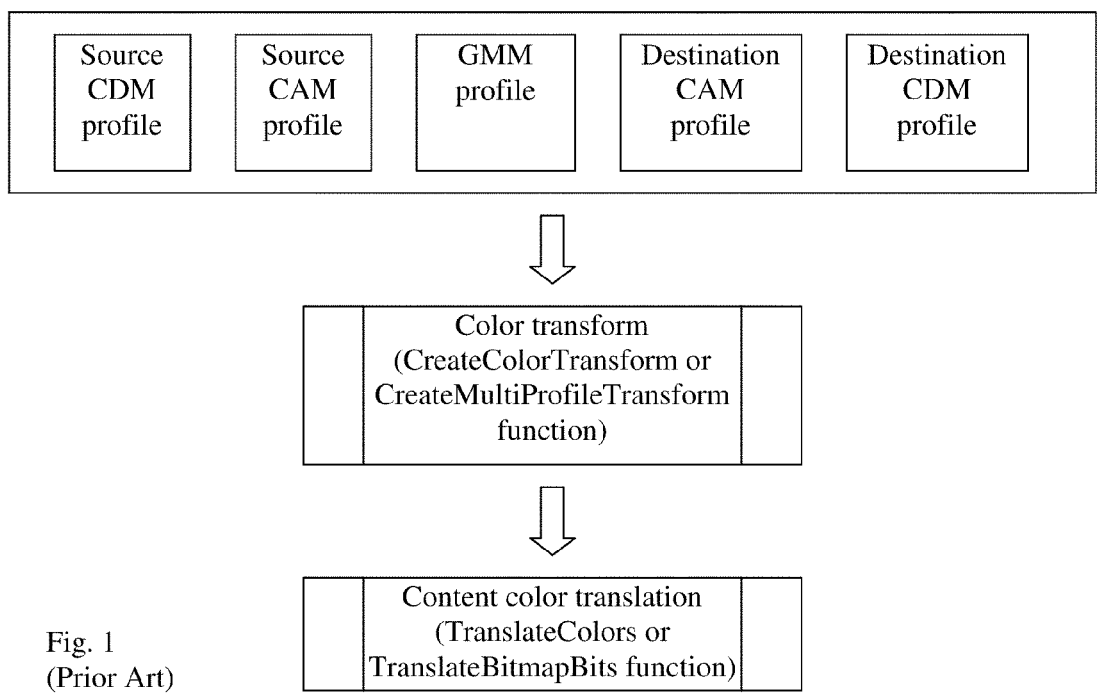
FIG. 1 illustrates a part of a conventional WCS pipeline for color management.

FIG. 1 illustrates a part of a conventional WCS pipeline during printing of documents. Various profiles are provided, including a source CDM profile (color device model profile, or CDMP), a source CAM profile (color appearance model profile, or CAMP), a GMM profile (gamut map model profile, or GMMP), a destination CDM profile, and a destination CAM profile. A CAMP is composed of XML tags that provide parametric values to the CIECAM02 color appearance model equation under particular viewing condition. A CDMP file stores measurement data that can be used by WCS device models to instantiate a model that relates device color space coordinates to a device independent color space, e.g. CIEXYZ. A GMMP provides information on the targeted Gamut Map Model. These profiles are created or modified off-line, i.e., not during a printing process.

During the printing process, a color transform is created, e.g., by calling the CreateColorTransform function or the CreateMultiProfileTransform function (or other appropriate functions) of WCS. These functions take the various profiles as input and perform color transform calculations using the WCS color management modules. The CreateMultiProfileTransform function is described in documentations provided by Microsoft available at http://msdn.microsoft.com/en-us/library/ms536799(VS.85).aspx.

The WCS color transform functions support custom plug-in modules. When no custom plug-in is provided, the color transform functions will use baseline modules to perform the color transform calculation. The content color translation step is then performed, e.g., by calling the TranslateColors or TranslateBitmapBits functions or other appropriate functions of WCS. Both color transform and content color translation steps are performed dynamically, i.e., each time a document is printed.

Figure 2A:
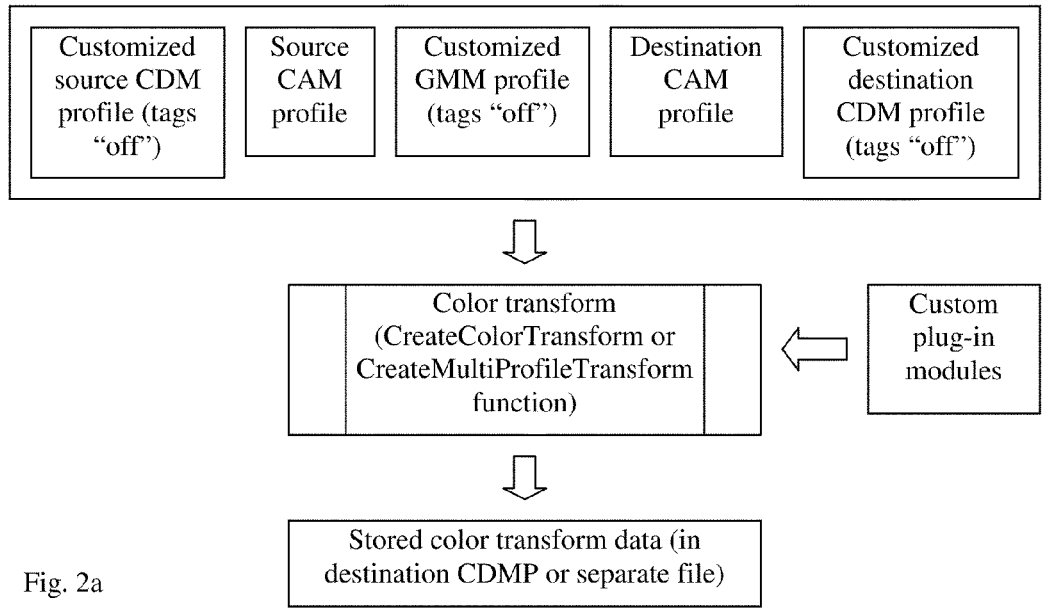
FIGS. 2a and 2b illustrate a modified WCS color management method according to an embodiment of the present invention.
Figure 2B:
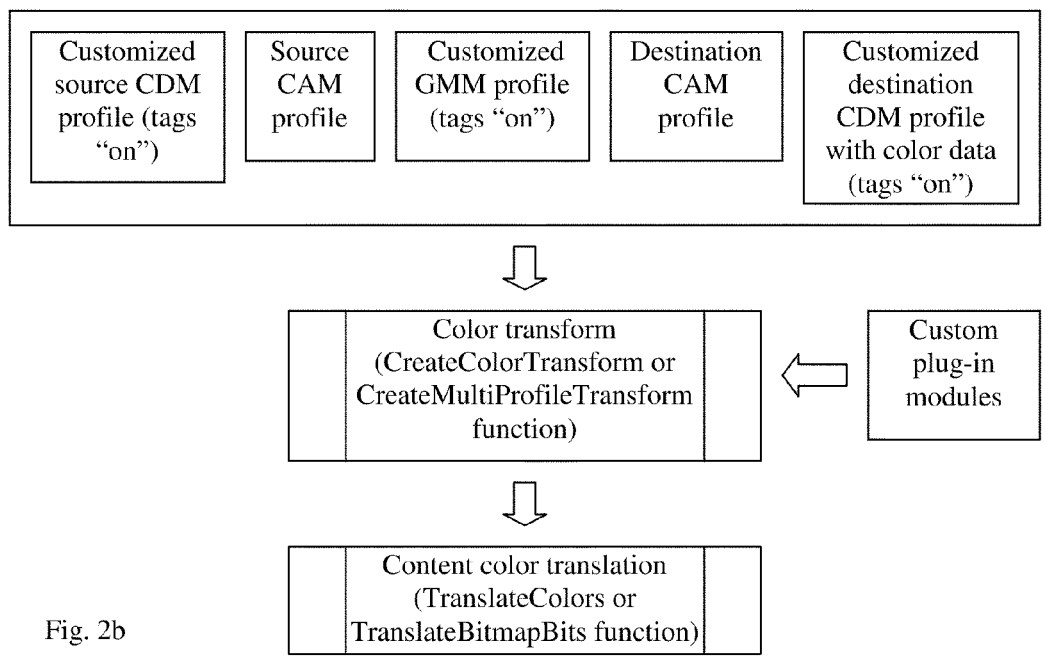

FIGS. 2a and 2b illustrate a method according to a first embodiment of the present invention. FIG. 2a illustrates a step of calculating color transform data based on various profiles and algorithms and storing the color transform data. This step is performed off-line. In this step, a customized source CDM profile, a customized GMM profile and a customized CDM profile are provided, as well as the source CAM profile and the destination CAM profile. These profiles are created or modified off-line. Any of the customized profiles may contain defined tags for parameters that are associated with the characteristics of the relevant models or different algorithms. In addition, the customized profiles also contain private (or customized) tags which are detected by the custom plug-ins, as will be described in more detail later.

Custom plug-in modules for the corresponding customized profiles are also provided, including, for example, a plug-in that support the GMM profile and a plug-in that support the destination CDM profile. These plug-in modules contain algorithms for calculating a color transform and for storing the calculated color transform data. The algorithms used in color transform process may be custom algorithms or a baseline algorithm provided by WCS. The color transform calculation step calls the WCS CreateColorTransform or CreateMultiProfileTransform function (or other appropriate functions), which takes the various profiles as input and calls the custom plug-ins. As a result, color transform data is calculated using the specified algorithms and stored for future use.

Preferably, the calculated color transform data is in the form of a lookup table, and stored in the destination CDM profile. A customized XML tag may be added to indicate the data. Other customized tags may be added to indicate the associated source CDMP, GMMP, source CAMP and destination CAMP in the calculation. Since the lookup table is usually very large, the file is preferably compressed, which is also done off-line. Alternatively, the data may be stored in a separate data file. In the latter case, one or more tags are provided in the destination CDM profile to indicate the location and name of the file.

Table I below shows a part of the program code that calls the CreateMultiProfileTransform function in the color transform calculation step:

TABLE I

```
HCMTRANSFORM hTranform = NULL; //transform handle
HPROFILE hProfiles[2] = {hInputCDMP, hOutputCDMP}; //profile handles
DWORD nProfiles = 2; //the number of profiles
DWORD dwIntent = INTENT_PERCEPTUAL; //rendering intents
DWORD nIntent = 1; //the number of intents
DWORD dwFlags=WCS_ALWAYS | NORMAL_MODE; //flags to control creation of
   the transform
hTranform = CMCreateMultiProfileTransform( hProfiles, nProfiles, &dwIntent, nIntent,
   dwFlags, INDEX_DONT_CARE);
```

Note that WCS currently does not allow custom plug-ins for the CAM profiles. In the future, if custom plug-ins are allowed, they can be provided for the CAM profiles as well.

FIG. 2b illustrates a part of the WCS pipeline corresponding to that shown in FIG. 1, which is performed dynamically, e.g., every time a document is printed. For convenience, the process shown in FIG. 2b is referred to as the printing step. A customized source CDM profile, a source CAM profile, a customized GMM profile, a customized destination CDM profile, and a destination CAM profile are provided, as well as custom plug-in modules that support the corresponding customized profiles. These profiles are created or modified off-line. The printing step calls the WCS CreateColorTransform or CreateMultiProfileTransform function (or other appropriate functions), which takes the various profiles as input and calls the custom plug-ins.

The customized source CDM profile, customized GMM profile, and customized destination CDM profile provided for the printing step are the same files as the corresponding ones provided for the color transform calculation step (FIG. 2a), except for the following. First, if the previously calculated color transform data is stored in the destination CDM profile, then the destination CDM profile provided in the printing step is different from the destination CDM profiled used in the color transform calculation step in this regard.

Second, the values of the customized tags are different in the two sets of customized profiles. These tags function to indicate whether special handling is required. For the color transform calculation step, the special-handling tags are set to a first value (referred to as "off" for convenience). During that step, upon detecting the "off" value of the tags, the corresponding plug-ins perform appropriate actions including calculating and storing the color transform data. For the printing step, the special-handling tags are set to a second value (referred to as "on" for convenience). During the printing step, upon detecting the "on" value for the tags, the corresponding plug-ins perform appropriate actions, which includes reading the previously stored color transform data (the lookup table) and sending the data to the WCS pipeline, without performing the color transform calculation. It should be noted that in a situation where the special-handling tags are "on" but the color transform data is not provided (or if the or the tags are "off" while the color transform data is provided), then color transform calculation will be performed during the printing step.

Thus, by using the tags in the customized profiles, the same set of custom plug-in modules can be used for both the color transform calculation step and the printing step. Different program code within the plug-ins will be executed in the two steps, depending on the values of the tags detected by the plug-ins.

In an alternative implementation, two different sets of plug-ins are provided: the first set is to be called in the color transform calculation step, and will perform color transform calculation; the second set is to be called in the printing step, and will read the previously stored color transform data without performing the color transform calculation. If two sets of plug-ins are used, the customized profiles will not need to have the customized tags to specify plug-in behaviors.

In either implementation, the parameters in the various profiles that define the characteristics of the relevant models are the same in the color transform calculation step and the printing step.

As shown in FIG. 2b, after calling the CreateColorTransform or CreateMultiProfileTransform function, the printing step calls the WCS TranslateColors or TranslateBitmapBits functions or other appropriate functions to perform content color translation. This step is the same as corresponding step in the conventional WCS pipeline shown in FIG. 1.

In the first embodiment described above, the printing process (FIG. 2b) is performed by the printer driver; i.e., the printer driver calls the CreateMultiProfileTransform function and the TranslateColors function or other appropriate functions.

Figure 3:
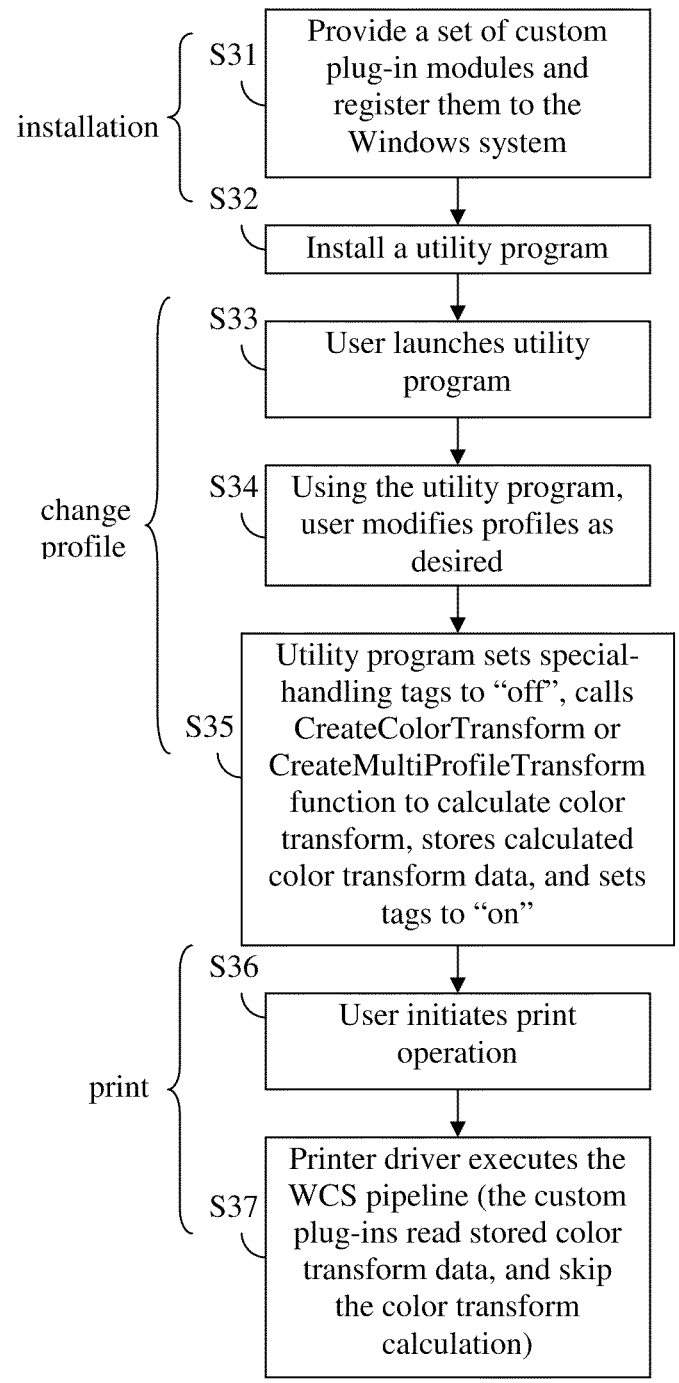
FIG. 3 is a flow chart illustrating a method according to a first embodiment of the present invention.

FIG. 3 summarizes the steps of the first embodiment, in which the customization is accomplished by providing the custom plug-ins and the customized profiles, while the printer driver does not need to be modified. To implement this embodiment on a computer having a printer driver already installed, a set of custom plug-in modules are provided and registered to the Windows system (step S31), and a utility program that calls the CreateMultiProfileTransform function is provided on the computer (step S32). Steps S31 and S32 are done once as an installation process. The registration of the custom plug-in modules may be a part of the installation or may be done by the user manually. It should be noted that the in a conventional system using the un-modified WCS pipeline, a utility program is provided to generate or modify profiles. Thus, step S32 may be implemented by providing a modified utility program which contains the functions of calculating color transform data.

Under this first embodiment, when any profile is to be changed (including created and/or modified), the user executes the utility program (step S33). Using the utility program, the user can create or modify the various profiles (source CDMP, GMMP, destination CDMP) (step S34). The utility program also sets the special-handling tags to the "off" value. The utility program calls the CreateMultiProfileTransform function or other appropriate functions, which calls the custom plug-ins as described earlier. Because the special-handling tags are turned "off", the custom plug-ins calculate the color transform data and stores it in the destination CDM profile. Then, the utility program modifies the various profiles again by setting the special-handling tags to the "on" value (step S35). Steps S33 to S35 are performed once when some profile is to be changed.

In an alternative implementation of steps S33 to S35, the utility program has two execution modes. When the user runs the utility program in the first mode (change profiles without color transform calculation), the utility program performs steps S33 and S34 only, but will not perform step S35. When the user runs the utility program in the second mode (change profiles and perform color transform calculation), the utility program performs steps S33, S34 and S35. This provides the user with the flexibility to change a profile without doing the color calculation immediately. For example, the user may change a number of profiles by repeatedly running the utility program in the first mode. If the special-handling tag is on, but the user chooses to run the utility program in the first mode so that a profile is changed without calculating the color transform, a warning message may be displayed to warn the user that mismatched setting may exist, and ask the user whether or not to remove the existing color transform data. If the user gives an affirmative answer, the existing color transform data will be removed and the value of the special tag will be set to "off".

Thereafter, when the user prints a document (step S36), the printer driver executes the WCS pipeline in a conventional manner (step S37), which includes calling the CreateColorTransform or CreateMultiProfileTransform function and calling the TranslateColors or TranslateBitmapBits function. However, when the CreateColorTransform or CreateMultiProfileTransform function calls the custom plug-ins, because the special-handling tags in the customized profiles have been set to "on", the custom plug-ins reads previously stored color transform data without performing the color transform calculation. As a result, printing speed is improved. Steps S36 and S37 are repeated every time the user prints a document.

Figure 4:
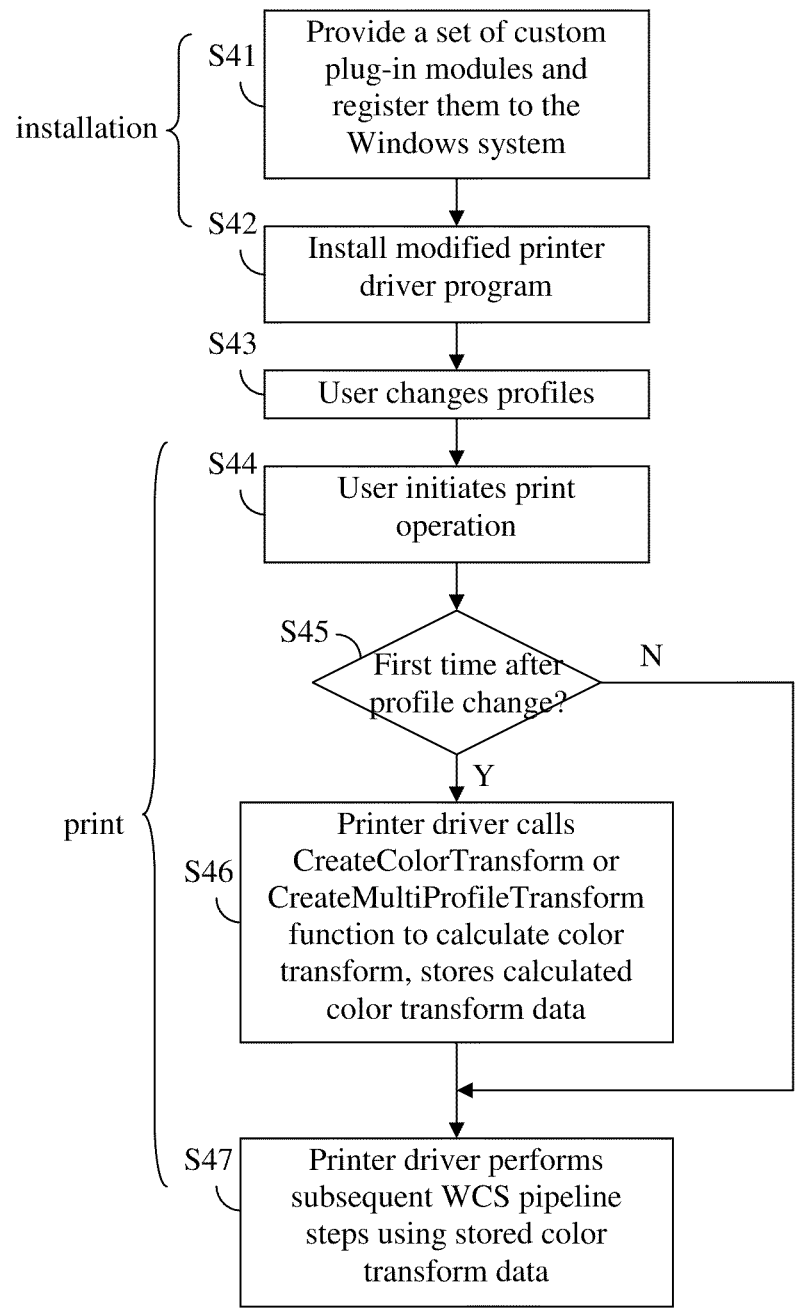
FIG. 4 is a flow chart illustrating a method according to a second embodiment of the present invention.

FIG. 4 summarizes the steps of a second embodiment of the present invention, in which a modified printer driver is provided to carry out the color transform calculation step. The custom plug-in modules are provided as in the first embodiment (step S41). The installation process also includes installing a modified printer driver (step S42). Later, the user changes a profile, which may be done by using a conventional utility program (step S43). A change in profile may include a situation where the selected profiles are different. When the user prints a document (step S44), the printer driver detects whether it is the first time any document is printed after a profile change (step S45). The detection may be done, for example, by keeping a record of the "last modified" date and time of each profile file. Upon detecting a new profile change ("Y" in step S45), the printer driver calls the CreateColorTransform or CreateMultiProfileTransform functions to calculate color transform data and stores the calculated data (e.g. similar to the process of FIG. 2a). In other words, the function of the color transform program for the first embodiment is now performed by the printer driver. The printer driver then uses the stored color transform data to perform the subsequent steps in the pipeline (e.g. content color translation) (step S47). Thus, for the first time of printing a document after a profile change, the printing process will includes the color transform calculation step S46.

Later, when another job (which may be the same document) is printed (step S44), the printer driver detects that no new profile change has occurred since the last printing ("N" in step S45). The printer driver skips the step of color transform calculation S46, and only performs the subsequent steps in the pipeline (e.g. content color translation) (step S47).

One way for the printer driver to store the calculated color transform data is by keeping the color transform handle for later print jobs. In conventional methods, for printing each document, the printer driver calculates the color transform and keeps a color transform handle for subsequent steps in the pipeline, and then frees the handle after the document is printed. In this implementation of the second embodiment, the printer driver keeps the color transform handle not only for the subsequent steps for the same document, but also for later print jobs until a new handle is created. As a result, when additional documents are printed, the color transform is not calculated and the printer driver will not call the CreateMultiProfileTransform function unless a new change is detected in step S45.

Another way for the printer driver to store the calculated color transform data is to save the data in memory or in a data file such as a copy of the destination CDM profile, so that the data can be read by the subsequent pipeline steps (S47) during printing of the current document and future documents.

In addition to the first and second embodiments, the invention may be implemented in a third embodiment which is slightly modified from the first embodiment. In the third embodiment, the printer driver is modified to add a "change profiles" button (or other suitable types of UI features) in the printer driver's user interface (UI). Steps S31 to S37 are performed in the third embodiment, except that in step S33, the utility program is launched when the user click the "change profile" button from the printer driver's UI.

The modified WCS pipeline according to embodiments of the present invention achieves enhanced print performance. Compared to the WCS baseline at the same conditions, in two tests performed by the inventor, the baseline took 2.2 s and 18.5 s for calculation during the printing process, while the modified WCS took 0.6 s and 5.1 s, respectively, when other conditions are the same.

It will be apparent to those skilled in the art that various modification and variations can be made in the color variation compensation method and apparatus of the present invention without departing from the spirit or scope of the invention. Thus, it is intended that the present invention cover modifications and variations that come within the scope of the appended claims and their equivalents.

What is claimed is:

1. A method implemented in a computer equipped with Windows color system (WCS) for printing color images, comprising:
    (a) providing a plurality of custom plug-in modules;
    (b) providing one or more profiles, including a customized source color device model (CDM) profile, a customized destination CDM profile, a customized gamut map model (GMM) profile, a source color appearance model (CAM) profile, and a destination CAM profile;
    (c) upon receiving a first user instruction to change a profile,
        (c1) changing one or more of the profiles or providing additional profiles;
        (c2) performing color transform using WCS functions and the custom plug-in modules to calculate color transform data; and
        (c3) storing the calculated color transform data;
    (d) upon receiving a second user instruction to print a document, performing content color translation using WCS functions to translate an array of colors from a source color space to a destination color space using the stored color transform data without calculating the color transform data; and
    (e) repeating step (d) upon receiving a third user instruction to print another document.

2. The method of claim 1, wherein step (c2) includes calling a first WCS function which calls the custom plug-in modules, and the custom plug-in modules calculating the color transform data upon detecting a first value of one or more customized tags in one or more of the profiles.

3. The method of claim 2, wherein step (c) further includes, after calculating the color transform data, setting the one or more customized tags in the one or more of the profiles to a second value different from the first value.

4. The method of claim 3, wherein step (d) includes:
   (d1) calling the first WCS function which calls the custom plug-in modules;
   (d2) the custom plug-in modules retrieving the stored color transform data upon detecting the second value of the one or more customized tags in the one or more of the profiles; and
   (d3) calling a second WCS function to translate the array of colors from the source color space to the destination color space using the retrieved color transform data.

5. The method of claim 1, wherein the color transform data is a color lookup table.

6. The method of claim 1, wherein step (c3) includes storing the color transform data in the customized destination CDM profile.

7. The method of claim 1, wherein step (c3) includes storing the color transform data in a data file, and providing a tag in the destination CDM profile to indicate a location and name of the data file.

8. A method implemented in a computer equipped with Windows color system (WCS) for printing color images, comprising:
   (a) providing a plurality of custom plug-in modules;
   (b) providing one or more profiles, including a customized source color device model (CDM) profile, a customized destination CDM profile, a customized gamut map model (GMM) profile, a source color appearance model (CAM) profile, and a destination CAM profile;
   (c) upon receiving a user instruction to print a document, determining whether a profile has been changed or added since a last document was printed;
   (d) if a profile has been changed or added since a last document was printed,
      (d1) performing color transform using WCS functions and the custom plug-in modules to calculate color transform data;
      (d2) storing the calculated color transform data by keeping a color transform handle; and
      (d3) performing content color translation using WCS functions to translate an array of colors from a source color space to a destination color space using the stored color transform data;
   (e) if no profile has been changed or added since a last document was printed, performing content color translation using WCS functions to translate an array of colors from a source color space to a destination color space using the stored color transform data without calculating the color transform data; and
   (f) repeating steps (c), (d) and (e) upon receiving another user instruction to print another document.

9. The method of claim 8, wherein step (d1) includes calling a first WCS function which calls the custom plug-in modules, and the custom plug-in modules calculating the color transform data.

10. The method of claim 8, wherein the color transform data is a color lookup table.

11. The method of claim 8, wherein step (d3) includes storing the color transform data in a file.

12. A computer program product comprising a computer usable non-transitory medium having a computer readable program code embedded therein for controlling a computer, the computer readable program code configured to cause the computer equipped with Windows color system (WCS) to execute a process which comprises:
   detecting a customized tag in one of a plurality of profiles;
   if the tag has first pre-determined value, regardless of other values in the profiles, calculating color transform data and storing the calculated color transform data, either by storing the calculated color transform data in a customized destination CDM profile, or by storing the calculated color transform data in a data file and providing a tag in a destination CDM profile to indicate a location and name of the data file; and
   if the tag has a second pre-determined value, regardless of other values in the profiles, retrieving stored color transform data without calculating the color transform data.

13. The computer program product of claim 12, wherein the color transform data is a color lookup table.

14. A computer program product comprising a computer usable non-transitory medium having a computer readable program code embedded therein for controlling a computer, the computer readable program code being a printer driver configured to cause the computer equipped with Windows color system (WCS) to execute a process for printing color images, the process comprising:
   detecting whether a profile has been changed or added since a last document was printed;
   if a profile has been changed or added since a last document was printed,
      (a) calling a first WCS function to calculate color transform data;
      (b) storing the calculated color transform data by keeping a color transform handle; and
      (c) calling a second WCS function to translate an array of colors from a source color space to a destination color space using the stored color transform data; and
   if no profile has been changed or added since a last document was printed, calling the second WCS function to translate an array of colors from a source color space to a destination color space using the stored color transform data without calculating the color transform data.

15. The computer program product of claim 14, wherein the color transform data is a color lookup table.

* * * * *